(12) United States Patent
Liu

(10) Patent No.: US 6,876,164 B2
(45) Date of Patent: Apr. 5, 2005

(54) COMPLEMENTARY FAN ROTATIONAL SPEED CONTROL METHOD AND APPARATUS

(75) Inventor: Nien-Hua Liu, Hsin-Tien (TW)

(73) Assignee: Zippy Technology Corp., Hsin-Tien (TW)

(*) Notice: Subject to any disclaimer, the term of this patent is extended or adjusted under 35 U.S.C. 154(b) by 0 days.

(21) Appl. No.: 10/613,079

(22) Filed: Jul. 7, 2003

(65) Prior Publication Data

US 2005/0007041 A1 Jan. 13, 2005

(51) Int. Cl.[7] ............................................. H02K 17/32

(52) U.S. Cl. ...................... 318/434; 318/268; 388/903

(58) Field of Search ................... 318/434, 268, 318/77; 388/903, 907.5, 908; 361/23; 417/2

(56) References Cited

U.S. PATENT DOCUMENTS

| | | | | |
|---|---|---|---|---|
| 5,977,733 A | * | 11/1999 | Chen | 318/434 |
| 6,398,505 B1 | * | 6/2002 | Sekiguchi | 417/2 |
| 2002/0187059 A1 | * | 12/2002 | Gold et al. | 417/366 |
| 2003/0115887 A1 | * | 6/2003 | Currie et al. | 62/3.3 |

* cited by examiner

Primary Examiner—Karen Masih
(74) Attorney, Agent, or Firm—Birch, Stewart, Kolasch & Birch, LLP.

(57) ABSTRACT

A complementary fan rotational speed control method and apparatus for simultaneously monitoring the rotation speeds of two or more fans includes a control unit to output pulse width modulation (PWM) control power supply to activate operation of a first fan and a second fan. The first and the second fan deliver rotation pulse signals to the control unit. When the control unit detects the rotation speed of either the first or second fan decreases, it actuates other fan to increase rotation speed and issues a warning signal to secure cooling effect and increase the service life of the fans.

5 Claims, 5 Drawing Sheets

COMPLEMENTARY FAN ROTATIONAL SPEED CONTROL METHOD AND APPARATUS

FIELD OF THE INVENTION

The present invention relates to a complementary fan rotational speed control method and apparatus, and particularly to a method and apparatus that uses a control unit to detect the rotation speed of two or more fans and to immediately increase the rotation speed of one fan when the rotation speed of other fan decreases thereby to secure cooling effect and increase the service life of the fans.

BACKGROUND OF THE INVENTION

At present, nearly all elements mounted on the circuit boards inside instruments, servers and power supplies have radiation apparatus installed thereon. Fan is one of the indispensable elements in these radiation apparatus. It can disperse thermal energy received by aluminum radiation fins or discharge thermal energy generated by the elements contained in the computers, servers and power supplies outside the casing so that the elements on the circuit boards may function properly without breaking down.

Thus heat dissipation mechanism has become an important procurement criterion of most 1U and 2U servers. The apparatus that adopt rack type structure employ a design different from general information products. They have a flat and narrow space, and electronic elements are densely located in a confined space. They have to overcome a high system resistance to smoothly discharge thermal energy. Hence airflow volume must be sufficiently large and the static pressure must be adequately strong to force and dispel the high temperature outside the machine casing.

Moreover, due to the servers often operate non-stop 24 hours a day, service life of the fans become very important. Once the fans malfunction, the high thermal energy of CPU, chip sets, power supply and memory could break down or burn out at high temperature. Thus the fans used in the servers not only have to withstand high temperature, they also should have durability warranty. Therefore some vendors have designed cooling fan with three essential criteria, i.e. high airflow, high static pressure and long service life.

While most fans used in the servers or power supply of servers have met the criteria mentioned above, in practical configuration the durability of the fans often is shortened. This mainly is caused by the design of heat dissipation arrangement. The fans usually are set to operate independently until they are broken down and replaced by new ones. Another design is to arrange many fans in the server and control in a fault-tolerant fashion. When one fan is down, another fan is activated immediately to carry on heat dissipation for the server to ensure that elements in the server can function properly. However such arrangement still cannot increase the durability of the fans. Moreover, when the rotation speed of malfunctioned fan drops and before other fan is activated, cooling effect cannot be maintained as desired.

SUMMARY OF THE INVENTION

Therefore the primary object of the invention is to resolve the aforesaid disadvantages and overcome the drawbacks of the prior art. The invention provides a control unit to simultaneously detect the rotation speeds of two fans. When the rotation speed of one fan decreases, the control unit immediately increases the rotation speed of other fan. Thus not only heat dissipation effect can be secured, service life of the fans can also be lengthened. Moreover, a warning notice may be issued to alert monitor which fan is malfunction so that repairs or replacement action may be taken promptly.

In order to achieve the foregoing object, the complementary fan rotational speed control method and apparatus of the invention aims at concurrently monitoring the rotational speeds of two or more fans. A control unit outputs a pulse wide modulation (PWM) control power supply to activate a first fan and a second fan. When the first fan and the second fan are activated, pulse signals of the rotational speed are generated by the first fan and the second fan and transferred back to the control unit. The control unit, based on the feedback rotation speed pulse signals, detects the rotational speeds of the first fan and the second fan. In the event that the rotation speed of either the first fan or the second fan decreases and has been detected by the control unit, the control unit orders other fan to increase the rotation speed and issues a warning signal to ensure that cooling effect is maintained properly and service life of the fans may increase.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
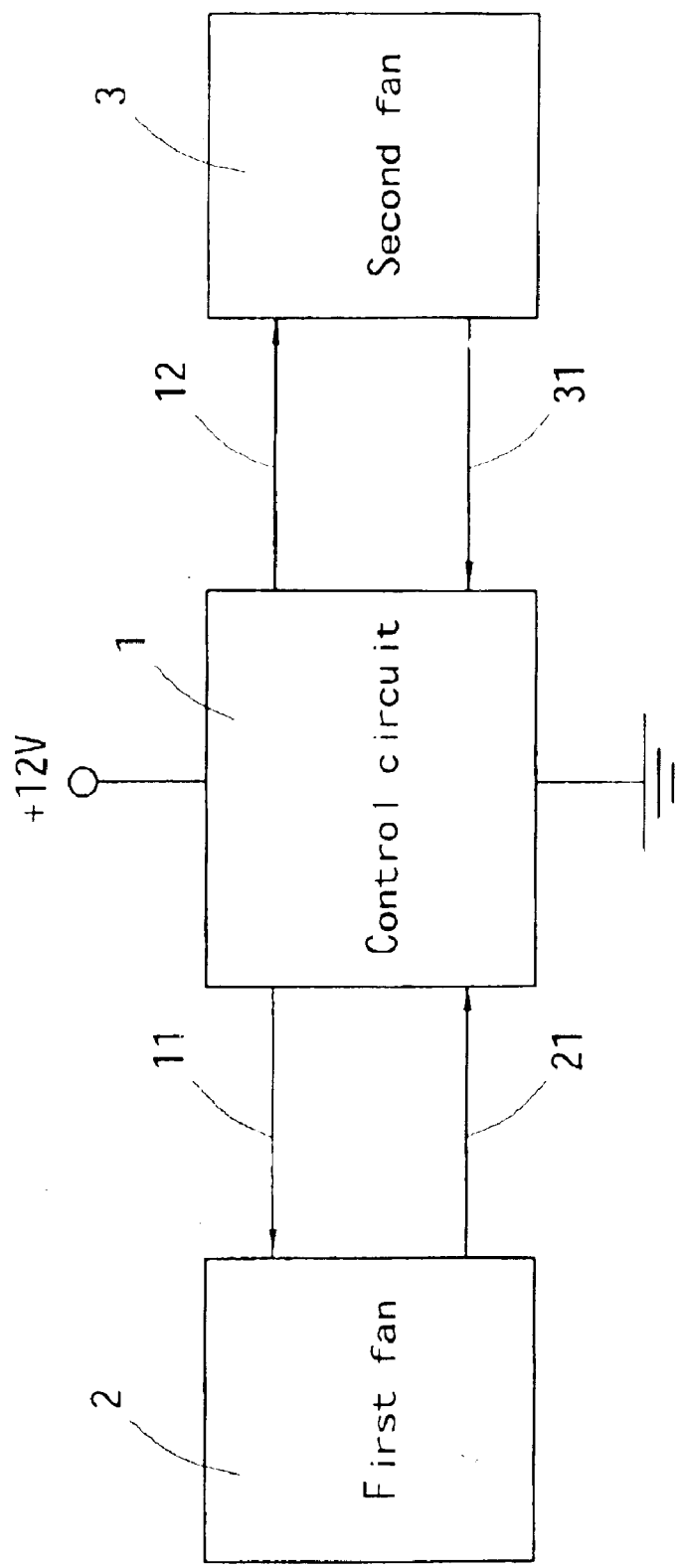
FIG. 1 is a block diagram of the complementary fan rotational speed control apparatus of the invention.

Please refer to FIG. 1, the complementary fan rotational speed control apparatus of the invention includes a control unit 1, a first fan 2 and a second fan 3 connecting to the control unit 1. The rotation speeds of the first fan 1 and the second fan 2 may be reduced to increase the service lives thereof, and provide sufficient cooling effect. In the event that the rotation speed of either one of the first or second fan 1 or 2 decreases, the rotation speed of other fan increases to maintain cooling effect for the elements which heat dissipation is required.

The control unit 1 outputs PWM control power supply 11 and 12.

The first fan 2 may be an axial fan or a radial fan. It receives the PWM control power supply 11 output from the control unit 1. After the first fan 2 is activated, it outputs a first rotation pulse signal 21 to the control unit 1.

The second fan 3 may be an axial fan or a radial fan. It receives the PWM control power supply 12 output from the control unit 1. After the second fan 3 is activated, it outputs a second rotation pulse signal 31 to the control unit 1.

After the control unit 1 outputs the PWM control power supply 111 and 12 that are received by the first and the second fan 2 and 3, the first and the second fan 2 and 3 are activated and rotate, and deliver the first rotation pulse signal 21 and second rotation pulse signal 31 to the control unit 1. The control unit 1 detects the operational conditions of the first fan 2 and the second fan 3. If the control unit 1 detects that the rotation speed of the first fan 2 decreases, it actuates the second fan 3 to increase its rotational speed to a full speed to maintain the cooling effect, and in the means time, issues a warning signal to alert operators to replace or repair the first fan 2 so that the service life of the fan may increase.

Figure 2A:
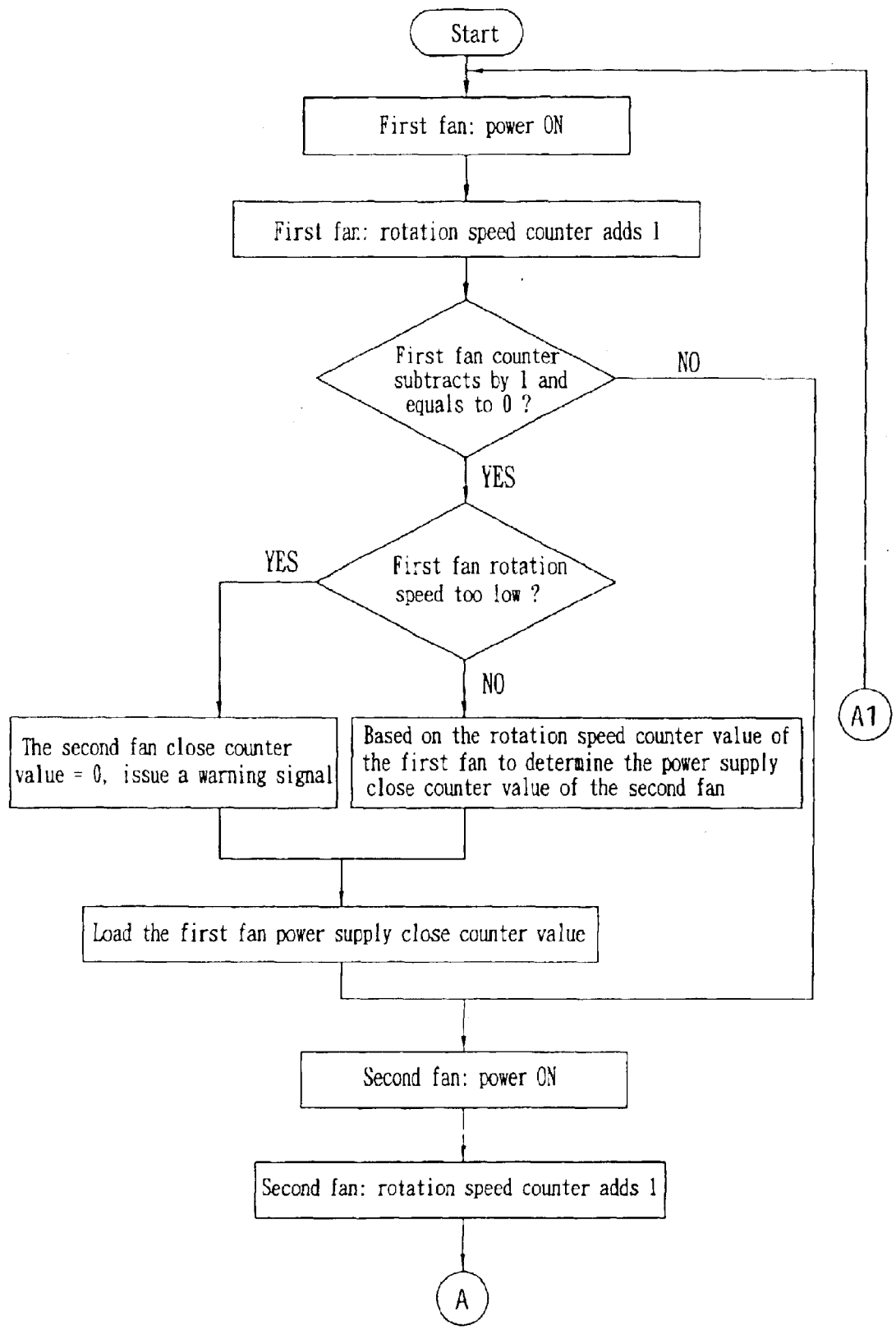
FIGS. 2A and 2B are control flow charts of the invention.
Figure 2B:
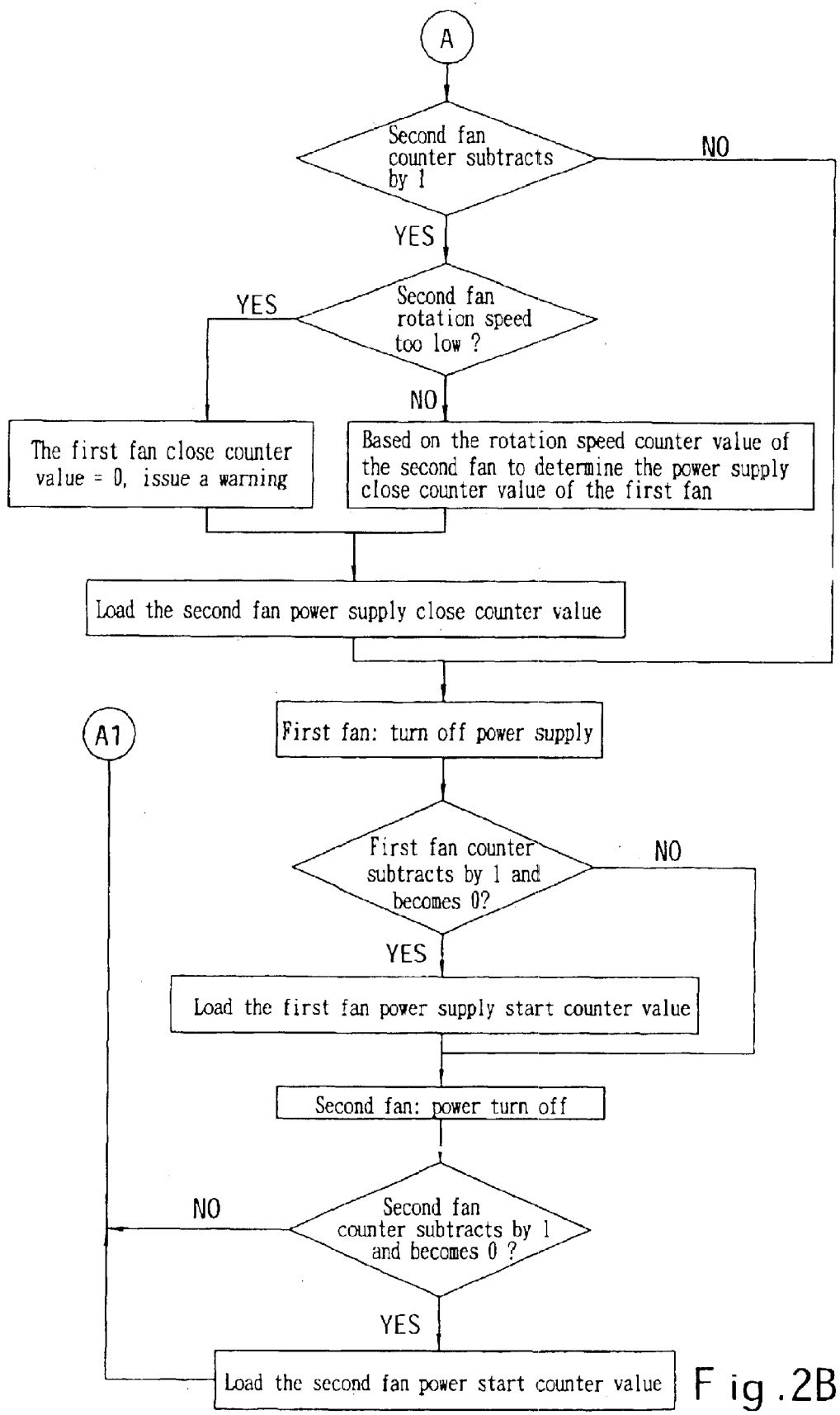

Refer to FIGS. 1, 2A and 2B for the control block diagram and process flow of the invention. As shown in the drawings, initially, power supply to the first fan 2 starts, and the rotation speed counter of the first fan 2 adds one, then determine whether the counter of the first fan 2 is subtracted by one and becomes zero; if no, the power supply for the second fan 3 is started;

if yes, determine whether the rotation speed of the first fan 2 is too slow;

if yes, close the counter value of the second fan 3 to become zero, and issue a malfunction warning signal;

if no, determine the power supply close counter value of the second fan 3 based on the rotation speed counter value of the first fan 2;

then load the power supply close counter value of the first fan 2, and activate the power supply of the second fan 3, and add one to the rotation speed counter of the second fan 3, and determine whether the counter of the second fan 3 is subtracted by one and becomes zero; if no, turn off the power supply of the first fan 2;

if yes, determine whether the rotation speed of the second fan 3 is too low; if yes, close the counter value of the first fan 2 to become zero, and issue a malfunction warning signal;

if no, determine the power supply close counter value of the first fan 2 based on the rotation speed counter value of the second fan 3; then load the power supply close counter value of the second fan 3, and turn off the power supply of the first fan 2, and determine whether the counter of the first fan 2 is subtracted by one and becomes zero;

if no, turn off the power supply of the second fan 3; if yes, load the power supply start counter value of the first fan 2, and turn off the power supply of the second fan 3;

then determine whether the counter of the second fan 3 is subtracted by one and becomes zero; if no, turn on the power supply of the first fan 2; if yes, load the power supply start counter value of the second fan 3, and turn on the power supply of the first fan 2. The processes are repeated under control. When the rotation speed of either the first fan 2 or the second fan 3 decreases, the rotation speed of other fan is increased to maintain the cooling effect for the elements which require heat dissipation. And a warning signal is issued to increase the service life of the fans.

Figure 3:
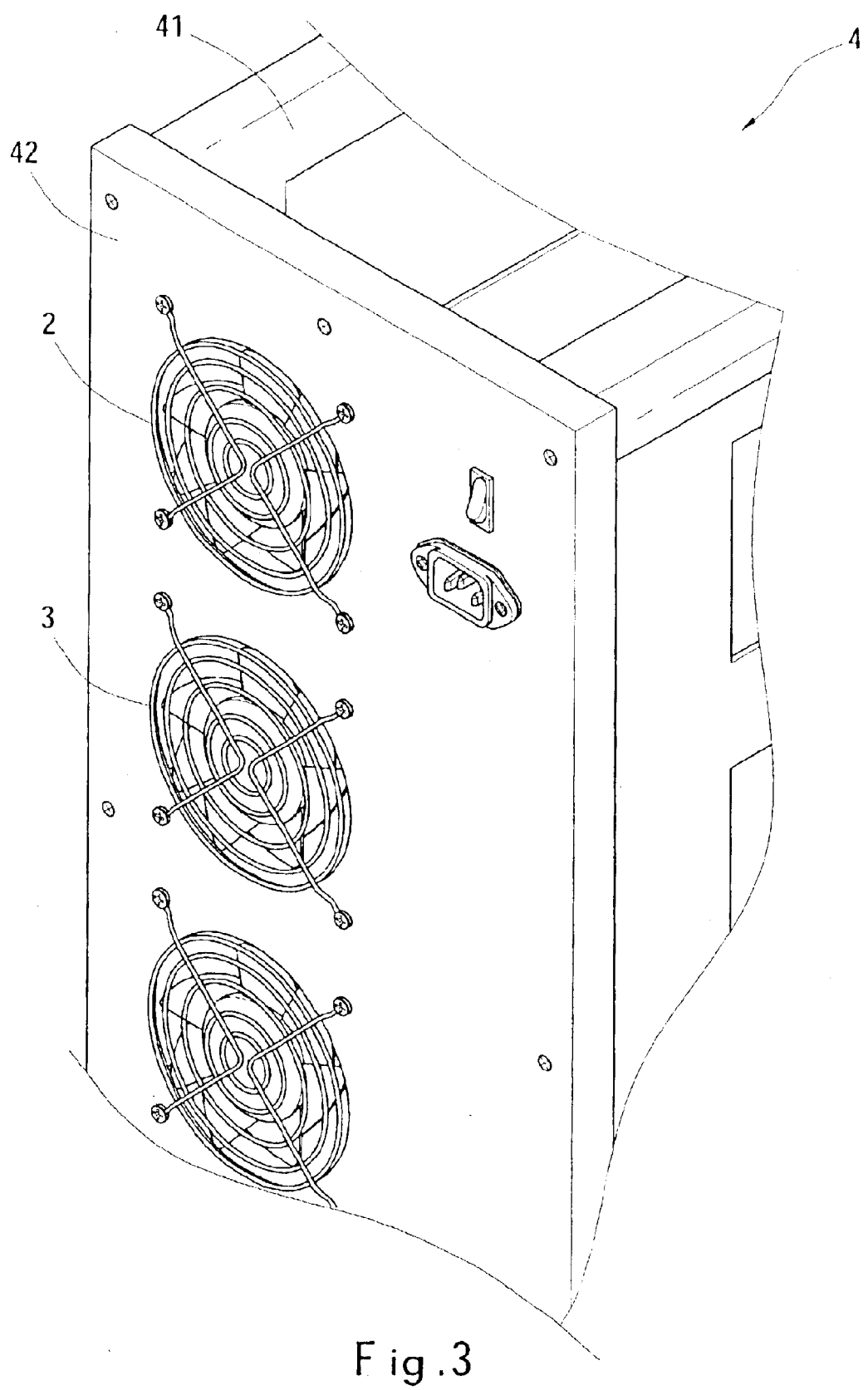
FIG. 3 is an illustrative view of the invention in use.

Refer to FIG. 3 for the invention in a use condition. A server 4 (a general personal computer) has a casing 41 which has a rear panel (or front panel) 42. On the panel 42, there are the first fan 2 and the second fan 3 installed thereon. When the first and the second fan 2 and 3 in operation, they can discharge heat generated by the elements located in the casing 41 of the server 4 outside the casing 41 so that the elements in the casing 41 may function properly.

In the event that the rotation speed of either the first fan 2 or the second fan 3 decreases, the rotation speed of other fan increases to maintain the cooling effect for the elements which require heat dissipation. And a warning signal is issued to increase the service life of the fans.

Figure 4:
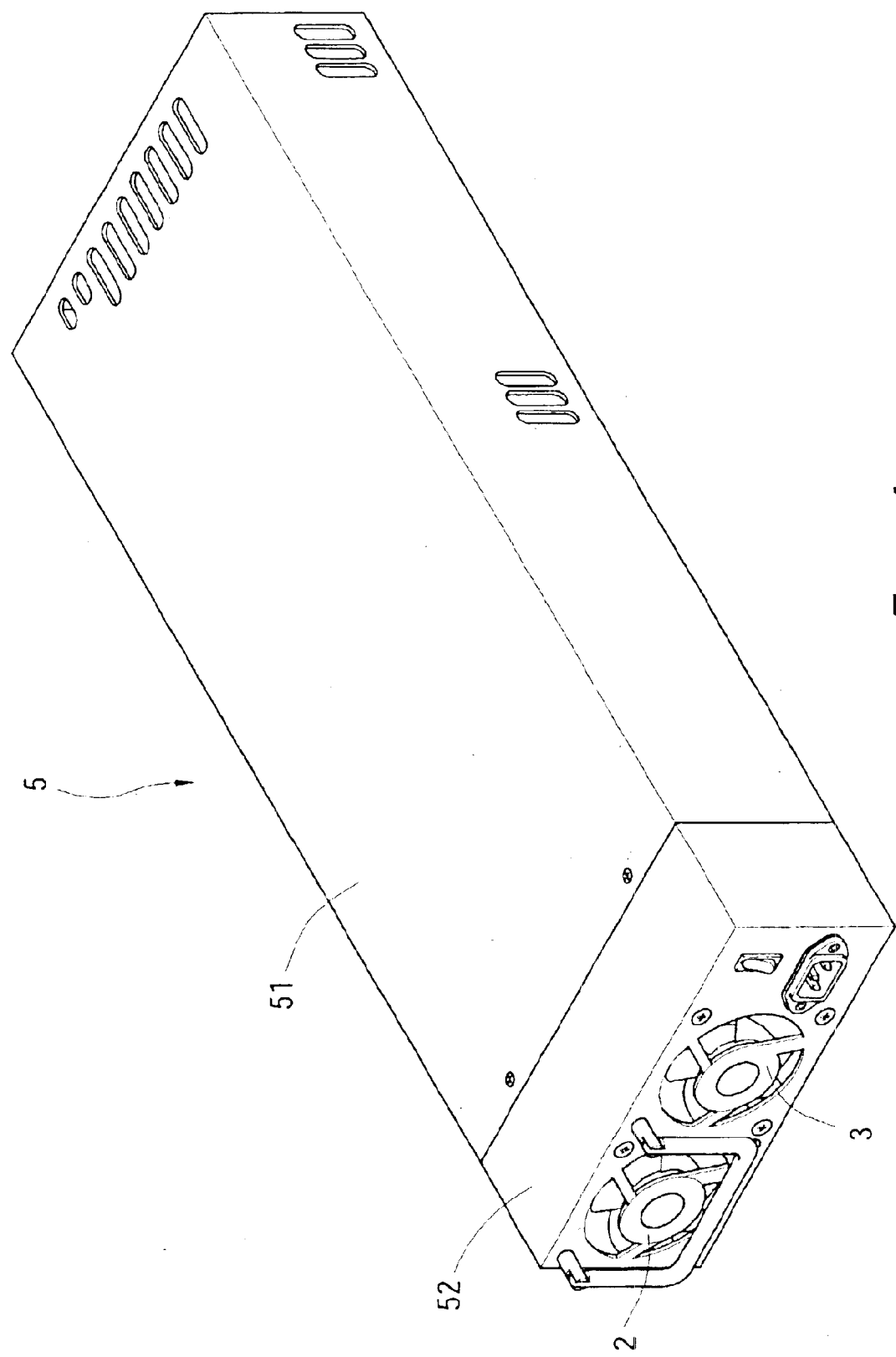
FIG. 4 is another illustrative view of the invention in use.

Refer to FIG. 4 for the invention in another use condition. A power supply 5 has a casing 51 which has a rear panel (or front panel) 52. On the panel 52, there are the first fan 2 and the second fan 3 installed thereon. When the first and the second fan 2 and 3 in operation, they can discharge heat generated by the elements located in the casing 51 of the power supply 5 outside the casing 51 so that the elements in the casing 51 may function properly.

In the event that the rotation speed of either the first fan 2 or the second fan 3 decreases, the rotation speed of other fan increases to maintain the cooling effect for the elements which require heat dissipation. And a warning signal is issued to increase the service life of the fans.

While the preferred embodiments of the invention have been set forth for the purpose of disclosure, modifications of the disclosed embodiments of the invention as well as other embodiments thereof may occur to those skilled in the art. Accordingly, the appended claims are tended to cover all embodiments which do not depart from the spirit and scope of the invention.

What is claimed is:

1. A complementary fan rotational speed control apparatus for simultaneously monitoring the rotation speeds of two or more fans, comprising:

a control unit for outputting pulse width modulation control power supply;

a first fan connected to the control unit, the first fan receiving the pulse width modulation control power supply from the control unit, having a first rotation speed when activated and outputting a first rotation pulse signal to the control unit; and a second fan connected to the control unit, the second fan receiving the pulse width modulation control power supply from the control unit, having at a second rotation speed when activated and outputting a second rotation pulse signal to the control unit;

the control unit detecting an actual rotation speed of the first fan based on the first rotation pulse signal and an actual rotation speed of the second fan based on the second rotation pulse signal, the control unit comparing the actual rotation speed of the first fan with the first rotation speed and comparing the actual rotation speed of the second fan with the second rotation speed, when the actual rotation speed of the first fan is lower than the first rotation speed, the control unit increasing the actual rotation speed of the second fan and issuing a warning signal to alert malfunction of the first fan.

2. The complementary fan rotational speed control apparatus of claim 1, wherein the first fan and the second fan are selectively axial fans or radial fans.

3. A complementary fan rotational speed control method for simultaneously monitoring the rotation speeds of two or more fans, comprising steps of:

outputting pulse width modulation control power supply from a control unit to activate a first fan and a second fan;

obtaining a first rotation speed of the first fan when the first fan is activated and a second rotation speed of the second fan when the fsecond fan is activated;

transferring rotation pulse signals from the first fan and the second fan to the control unit after the first fan and the second fan have been activated, the control unit detecting the actual rotation speeds of the first fan and the second fan based on the received rotation pulse signals;

comparing the actual rotation speed of the first fan with the first rotation speed and comparing the actual rotation speed of the second fan with the second rotation speed;

increasing the actual rotation speed of the second fan when the actual rotation speed of the first fan is lower than the first rotation speed; and issuing a warning signal to alert malfunction of the first fan.

4. The complementary fan rotational speed control apparatus of claim 1, wherein when the actual rotation speed of the second fan is lower than the second rotation speed, the control unit increases the actual rotation speed of the first fan and issuing a warning signal to alert malfunction of the second fan.

5. A complementary fan rotational speed control method of claim 3, further comprising:

increasing the actual rotation speed of the first fan when the actual rotation speed of the second fan is lower than the second rotation speed; and issuing a warning signal to alert malfunction of the second fan.

* * * * *